United States Patent
Masterson et al.

(10) Patent No.: US 10,466,882 B2
(45) Date of Patent: Nov. 5, 2019

(54) COLLABORATIVE CO-AUTHORING VIA AN ELECTRONIC USER INTERFACE

(71) Applicant: MICROSOFT TECHNOLOGY LICENSING, LLC, Redmond, WA (US)

(72) Inventors: Joseph Masterson, Maple Valley, WA (US); Nathan Waddoups, Redmond, WA (US); Mirela Correa, Redmond, WA (US); Kenneth Fern, Bellevue, WA (US); David Lloyd Meyers, Jr., Seattle, WA (US); David Paul Limont, Seattle, WA (US); Jin Ma, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/497,273

(22) Filed: Sep. 25, 2014

(65) Prior Publication Data

US 2015/0277725 A1    Oct. 1, 2015

Related U.S. Application Data

(60) Provisional application No. 61/973,164, filed on Mar. 31, 2014.

(51) Int. Cl.
*G06F 3/0484* (2013.01)
*G06F 17/24* (2006.01)
*G06Q 10/10* (2012.01)

(52) U.S. Cl.
CPC ...... *G06F 3/04847* (2013.01); *G06F 3/04842* (2013.01); *G06F 17/24* (2013.01); *G06Q 10/10* (2013.01); *G06Q 10/107* (2013.01)

(58) Field of Classification Search
CPC .. G06F 3/04847; G06F 3/04842; G06F 17/24; G06Q 10/10; G06Q 10/107
See application file for complete search history.

(56) References Cited

U.S. PATENT DOCUMENTS

| 5,818,447 A | 10/1998 | Wolf et al. |
| 6,088,696 A | 7/2000 | Moon et al. |

(Continued)

FOREIGN PATENT DOCUMENTS

| CN | 1577279 A | 2/2005 |
| CN | 1722711 A | 1/2006 |

(Continued)

OTHER PUBLICATIONS

PCT International Preliminary Report on Patentability Issued in PCT Application No. PCT/US2015/022611, dated Apr. 7, 2016, 13 Pages.

(Continued)

*Primary Examiner* — Abdullah Al Kawsar
*Assistant Examiner* — Jeremy L Stanley

(57) ABSTRACT

Automatic uploading of electronic communication attachments to a collaborative storage location for enabling efficient co-authoring among a group of users is provided. When an electronic communication item is received that contains an attached content item, a user may select the content item for review and/or editing. A communication (e.g., a responsive email message) may be automatically created and may include an attachment pointer to direct recipients of the communication to the location at which the edited content item will be stored at a collaborative group storage location. The communication may also include a posting for notifying recipients of the communication that the associated content item has been edited and by whom the content item was edited. Recipients of the communication may then locate the edited content item and may begin (Continued)

reviewing and/or editing the stored content item in a collaborative co-authoring environment.

16 Claims, 11 Drawing Sheets

(56) References Cited

U.S. PATENT DOCUMENTS

| | | | |
|---|---|---|---|
| 6,304,898 B1 | 10/2001 | Shiigi | |
| 7,076,730 B1 | 7/2006 | Baker | |
| 7,130,885 B2 | 10/2006 | Chandra et al. | |
| 7,243,298 B2* | 7/2007 | Yozell-Epstein | G06Q 10/107 |
| | | | 715/273 |
| 7,424,676 B1 | 9/2008 | Carlson et al. | |
| 7,437,421 B2 | 10/2008 | Bhogal et al. | |
| 7,730,146 B1 | 6/2010 | Mace et al. | |
| 7,730,147 B1 | 6/2010 | Derhak et al. | |
| 8,108,464 B1* | 1/2012 | Rochelle | H04L 51/00 |
| | | | 709/204 |
| 8,108,763 B2 | 1/2012 | Gao et al. | |
| 8,122,364 B2 | 2/2012 | Yozell-Epstein et al. | |
| 8,185,591 B1 | 5/2012 | Lewis | |
| 8,214,395 B2 | 7/2012 | Stevens et al. | |
| 8,352,554 B2 | 1/2013 | Estrada et al. | |
| 8,386,573 B2 | 2/2013 | O'Sullivan et al. | |
| 8,527,549 B2 | 9/2013 | Cidon | |
| 8,965,983 B2* | 2/2015 | Costenaro | G06F 17/241 |
| | | | 705/311 |
| 9,384,470 B2 | 7/2016 | Lemay et al. | |
| 9,660,831 B2 | 5/2017 | Chen et al. | |
| 9,703,596 B2 | 7/2017 | Lyndersay et al. | |
| 9,703,791 B2 | 7/2017 | Blom et al. | |
| 9,756,002 B2 | 9/2017 | Massand | |
| 2003/0154207 A1 | 8/2003 | Naito | |
| 2004/0034688 A1 | 2/2004 | Dunn | |
| 2004/0172450 A1 | 9/2004 | Edelstein et al. | |
| 2004/0267871 A1 | 12/2004 | Pratley et al. | |
| 2006/0069990 A1 | 3/2006 | Yozell-Epstein et al. | |
| 2006/0075004 A1 | 4/2006 | Stakutis et al. | |
| 2006/0075046 A1* | 4/2006 | Yozell-Epstein | G06Q 10/107 |
| | | | 709/206 |
| 2006/0075049 A1 | 4/2006 | Matsubara | |
| 2006/0085508 A1 | 4/2006 | Uchida et al. | |
| 2007/0266093 A1 | 11/2007 | Forstall et al. | |
| 2008/0028017 A1 | 1/2008 | Garbow et al. | |
| 2008/0046518 A1* | 2/2008 | Tonnison | G06Q 10/107 |
| | | | 709/206 |
| 2009/0177754 A1 | 7/2009 | Brezina et al. | |
| 2009/0228716 A1* | 9/2009 | Poston | G06F 21/6209 |
| | | | 713/189 |
| 2009/0319618 A1 | 12/2009 | Affronti et al. | |
| 2010/0159889 A1 | 6/2010 | Sigmund et al. | |
| 2010/0198927 A1 | 8/2010 | Tonnison et al. | |
| 2010/0257457 A1 | 10/2010 | De Goes | |
| 2011/0276897 A1 | 11/2011 | Crevier et al. | |
| 2012/0124143 A1 | 5/2012 | Chung et al. | |
| 2012/0173612 A1 | 7/2012 | Vegesna-Venkata et al. | |
| 2012/0254321 A1 | 10/2012 | Lindsay et al. | |
| 2012/0265817 A1 | 10/2012 | Vidalenc et al. | |
| 2012/0278281 A1* | 11/2012 | Meisels | G06Q 10/107 |
| | | | 707/625 |
| 2012/0278401 A1* | 11/2012 | Meisels | G06F 17/24 |
| | | | 709/206 |
| 2012/0278404 A1* | 11/2012 | Meisels | G06Q 10/107 |
| | | | 709/206 |
| 2012/0278405 A1* | 11/2012 | Costenaro | H04L 67/2857 |
| | | | 709/206 |
| 2012/0284344 A1* | 11/2012 | Costenaro | G06F 17/241 |
| | | | 709/206 |
| 2012/0284345 A1* | 11/2012 | Costenaro | G06Q 10/107 |
| | | | 709/206 |
| 2012/0284639 A1* | 11/2012 | Yuniardi | G06Q 10/00 |
| | | | 715/752 |
| 2013/0080545 A1 | 3/2013 | Datta | |
| 2013/0080785 A1 | 3/2013 | Ruhlen et al. | |
| 2013/0117376 A1 | 5/2013 | Filman et al. | |
| 2013/0179515 A1 | 7/2013 | Chi et al. | |
| 2013/0212112 A1* | 8/2013 | Blom | G06F 17/30115 |
| | | | 707/741 |
| 2013/0262420 A1 | 10/2013 | Edelstein et al. | |
| 2013/0332850 A1 | 12/2013 | Bovet et al. | |
| 2014/0006516 A1 | 1/2014 | Nivala et al. | |
| 2014/0195928 A1 | 7/2014 | Carlen | |
| 2015/0277724 A1 | 10/2015 | Masterson et al. | |
| 2015/0281149 A1 | 10/2015 | Masterson et al. | |
| 2015/0281150 A1 | 10/2015 | Masterson et al. | |
| 2017/0230318 A1 | 8/2017 | Carlen | |

FOREIGN PATENT DOCUMENTS

| | | |
|---|---|---|
| CN | 1755680 A | 4/2006 |
| CN | 101315621 A | 12/2008 |
| CN | 102812477 A | 12/2012 |
| CN | 102859513 A | 1/2013 |
| EP | 1182600 A2 | 2/2002 |

OTHER PUBLICATIONS

Thurroti, Paul., "Windows 8.1 Tip: Master Auto-Snap", Published on: Sep. 22, 2013 Available at: http://winsupersite.com/windows-8/windows-81-tip-master-auto-snap.

"OSX : Force mail.app to show attachments as iconsDate", Published on: Feb. 12, 2014 Available at: http://endlessgeek.com/2014/02/osx-force-mai 1-app-show-attachments-icons/.

Hodges, Mati., "Mission Control: Advanced Attachment Management in Confluence with Arsenale Lockpoinl", Published on: Jan. 9, 2012 Available at: https://blogs.atlassian.com/2012/01/extend-confluence-wiki-document-management-capabilities/.

Wolber, Andy., "View and edit Microsoft Office file attachments received in Gmail", Published on: Jan. 28, 2014 Available at: http://www.techrepublic.com/blog/goog le-in-the-enterprise/view-and-ed it-microsoft-office-fi le-attachments-received-in-gmail/#.

Bradley, Helen., "Share & Collaborate with SkyDrive & Microsoft Office", Published on: Feb. 15, 2013 Available at: http://www.smallbusinesscomputing.com/News/Software/share-collaborate-with-skydrive-microsoft-office.html.

"International Search Report and Written Opinion Issued in PCT Application No. PCT/US2015/022611", dated Jun. 29, 2015, 11 Pages.

"Zoho Docs—New Features and Enhancements", Published on: Jan. 11, 2012, Available at: https://www.zoho.com/docs/whatsnew.html.

"Share and Collaborate in Drive on your iPhone and iPad", Retrieved on: Mar. 24, 2014, Available at: https://support.google.com/drive/answer/2498081?hl=en.

"Blogs Twitter, wikis and other web-based tools", Published on: Jun. 16, 2011, Available at: http://research20atimperial.wordpress.com/optional-content/online-collaborative-tools/.

"Acrobat.com Help / Collaborate in real time", Published on: Mar. 29, 2013, Available at: http://helpx.adobe.com/acrobat-com/help/collaborate-real-time.html.

Thurrott, Paul, "Microsoft Previews Real-Time Co-authoring in Office Web Apps" Published on: Jun. 20, 2013, Available at: http://winsupersite.com/office-365/microsoft-previews-real-time-co-authoring-office-web-apps.

"Zoho API Guide", Published on: Sep. 27, 2011, Available at: https://apihelp.wiki.zoho.com/Doc-Collaboration.html.

U.S. Office Action in U.S. Appl. No. 14/497,270, dated Apr. 2, 2018, 58 pages.

"Final Office Action Issued in U.S. Appl. No. 14/497,263", dated May 17, 2017, 36 Pages.

"Final Office Action Issued in U.S. Appl. No. 14/497,263", dated May 29, 2018, 59 Pages.

"Non Final Office Action Issued in U.S. Appl. No. 14/497,263", dated Sep. 26, 2016, 40 Pages.

"Non Final Office Action Issued in U.S. Appl. No. 14/497,263", dated Dec. 19, 2017, 50 Pages.

(56) References Cited

OTHER PUBLICATIONS

"Non Final Office Action Issued in U.S. Appl. No. 14/497,270", dated Oct. 5, 2017, 54 Pages.
"Final Office Action Issued in U.S. Appl. No. 14/497,281", dated Jan. 25, 2018, 34 Pages.
"Non Final Office Action Issued in U.S. Appl. No. 14/497,281", dated Jul. 13, 2017, 23 Pages.
"Final Office Action Issued in U.S. Appl. No. 14/497,270", dated Apr. 14, 2017, 40 Pages.
"Non Final Office Action Issued in U.S. Appl. No. 14/497,270", dated Sep. 21, 2016, 35 Pages.
"Second Written Opinion Issued in PCT Application No. PCT/US2015/022608", dated Feb. 5, 2016, 6 Pages.
"International Preliminary Report on Patentability Issued in PCT Application No. PCT/US2015/022608", dated Jun. 16, 2016, 10 pages.
"Second Written Opinion Issued in PCT Application No. PCT/US2015/022610", dated Dec. 4, 2015, 7 Pages.
"International Search Report and Written Opinion Issued in PCT Application No. PCT/US2015/022612", dated Jun. 29, 2015, 11 Pages.
"Second Written Opinion Issued in PCT Application No. PCT/US2015/022612", dated Dec. 4, 2015, 6 Pages.
"International Preliminary Report on Patentability Issued in PCT Application No. PCT/US2015/022612", dated Apr. 7, 2016, 7 Pages.
"Final Office Action Issued in U.S. Appl. No. 14/497,281", dated Feb. 19, 2019, 26 Pages.
"Non Final Office Action Issued in U.S. Appl. No. 14/497,281", dated Aug. 23, 2018, 26 Pages.
"Office Action Issued in European Patent Application No. 15717322.0", dated Jun. 15, 2018, 5 Pages.
European Office Action in Application 15717322.0, dated Nov. 8, 2016, 2 pages.
PCT International Preliminary Report on Patentability Issued in PCT Application No. PCT/US2015/022610, dated Apr. 7, 2016, 8 Pages.
PCT International Search Report & Written Opinion Received for PCT Patent Application No. PCT/US2015/022610, dated Jun. 29, 2015, 12 Pages.
PCT International Search Report and Written Opinion Issued in PCT Application No. PCT/US2015/022608, dated Jun. 15, 2015, 12 Pages.
"Office Action Issued in Chinese Patent Application No. 201580018360.7", dated Oct. 22, 2018, 12 Pages.
"European Office Action Issued in Patent Application No. 15715090.5", dated Oct. 29, 2018, 8 Pages.
"Office Action Issued in Chinese Patent Application No. 201580018310.9", dated Mar. 5, 2019, 17 Pages.
"Office Action Issued in Chinese Patent Application No. 201580018358.X", dated Mar. 5, 2019, 10 Pages.
"Office Action Issued in Chinese Patent Application No. 201580018367.9", dated Mar. 6, 2019, 10 Pages.
"Office Action Issued in European Patent Application No. 15716277.7", dated Jan. 9, 2019, 7 Pages.
"Non Final Office Action Issued in U.S. Appl. No. 14/497,263", dated Nov. 1, 2018, 66 Pages.
"Non Final Office Action Issued in U.S. Appl. No. 14/497,281", dated Aug. 5, 2019, 15 Pages.
"Second Office Action Issued in Chinese Patent Application No. 201580018367.9", dated Aug. 9, 2019, 6 Pages.
"Second Office Action Issued in Chinese Patent Application No. 201580018358.X", dated Aug. 22, 2019, 5 Pages.

* cited by examiner

COLLABORATIVE CO-AUTHORING VIA AN ELECTRONIC USER INTERFACE

CROSS-REFERENCE TO RELATED APPLICATIONS

This application claims the benefit of U.S. Provisional Patent Application No. 61/973,164, filed Mar. 31, 2014.

BACKGROUND OF THE INVENTION

Computer and computer software users have become accustomed to generating, editing, receiving and sending many types of content items, for example, documents of different types, photographs, images, electronic mail items, calendaring items, notes items, and the like. In a typical electronic mail setting, a user often attaches a document or other content item (hereafter referred to as "attachment" or "content item") to an electronic mail item he/she then sends to a receiving user for review or editing. The receiving user then typically downloads the received attachment to his/her local computing device or to an enterprise (local or remote) storage repository, for example, a company or school file server or a remote server at which the receiving user has a storage location or at a collaborative file storage location at which the sending user and the receiving user store content items for receiving and editing as part of a collaborative work group of any of a number of types.

If the receiving user edits the attachment, he/she typically saves the edited attachment content item to the storage location (described above). When the receiving user then desires to reply back to the sending user with the edited attachment or desires to send the edited attachment to other users or desires to add the edited attachment to a calendar entry, task entry, notes entry, meeting request, or the like, the receiving (and editing) user must locate the edited content item at the storage location and must attach the edited content item to the appropriate communication medium (e.g. email, text message, instant message, video conference, calendar entry, notes entry, task entry, meeting request, etc.). For example, the receiving user may then attach the edited content item to a reply email that may be sent back to the sending user for review.

Such a process is particularly problematic in a group setting where a group of users are working together in a collaborative workgroup and where each member of the group may need or desire to work on a single document in a co-authoring process. That is, such a receive, store, edit, store, retrieval, attach and disposition process is not only time consuming, memory consuming and process consuming, but may result in multiple copies of an edited content item being stored to a collaborative group's storage location, making co-authoring of a particular content item difficult.

It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing automatic uploading of electronic mail attachments to a collaborative storage location for enabling efficient co-authoring among a group of users. When an electronic mail item is received in association with a collaborative workgroup of a plurality of users, where the mail contains an attached content item such as a document, dataset, image, or the like, a user may select the content item for presentation in an immersive view pane in proximity to an electronic communication view pane to allow the user to review the received content item and associated electronic communication with which the received content item was received. If the receiving user initiates an editing function on the displayed content item, a copy of the displayed content item is automatically stored to a collaborative group storage location associated with the user's collaborative workgroup. When the user begins editing the displayed content item, a communication (e.g., a responsive email message) is automatically created and is displayed in the electronic communication view pane. According to one embodiment the automatically generated communication may include an attachment pointer to direct recipients of the communication to the location at which the edited content item will be stored at the collaborative group storage location and a posting for notifying recipients of the communication that the associated content item has been edited and by whom the content item was edited. In addition, the communication may include a text entry entered by the editing user to provide information about the edited content item to recipients of the communication.

When the editing user completes edits, the edits to the received content item may be pushed to and applied to the associated content item stored at the collaborative group storage location, and the automatically generated communication may be sent to one or more recipients (e.g., members of the editing users collaborative workgroup) to notify the recipients of edits made to the associated content item and to provide a pointer to the storage location of the edited content item. Recipients of the communication may then locate the edited content item and may begin reviewing and/or editing the stored content item in a collaborative co-authoring environment.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

DETAILED DESCRIPTION

Figure 1:
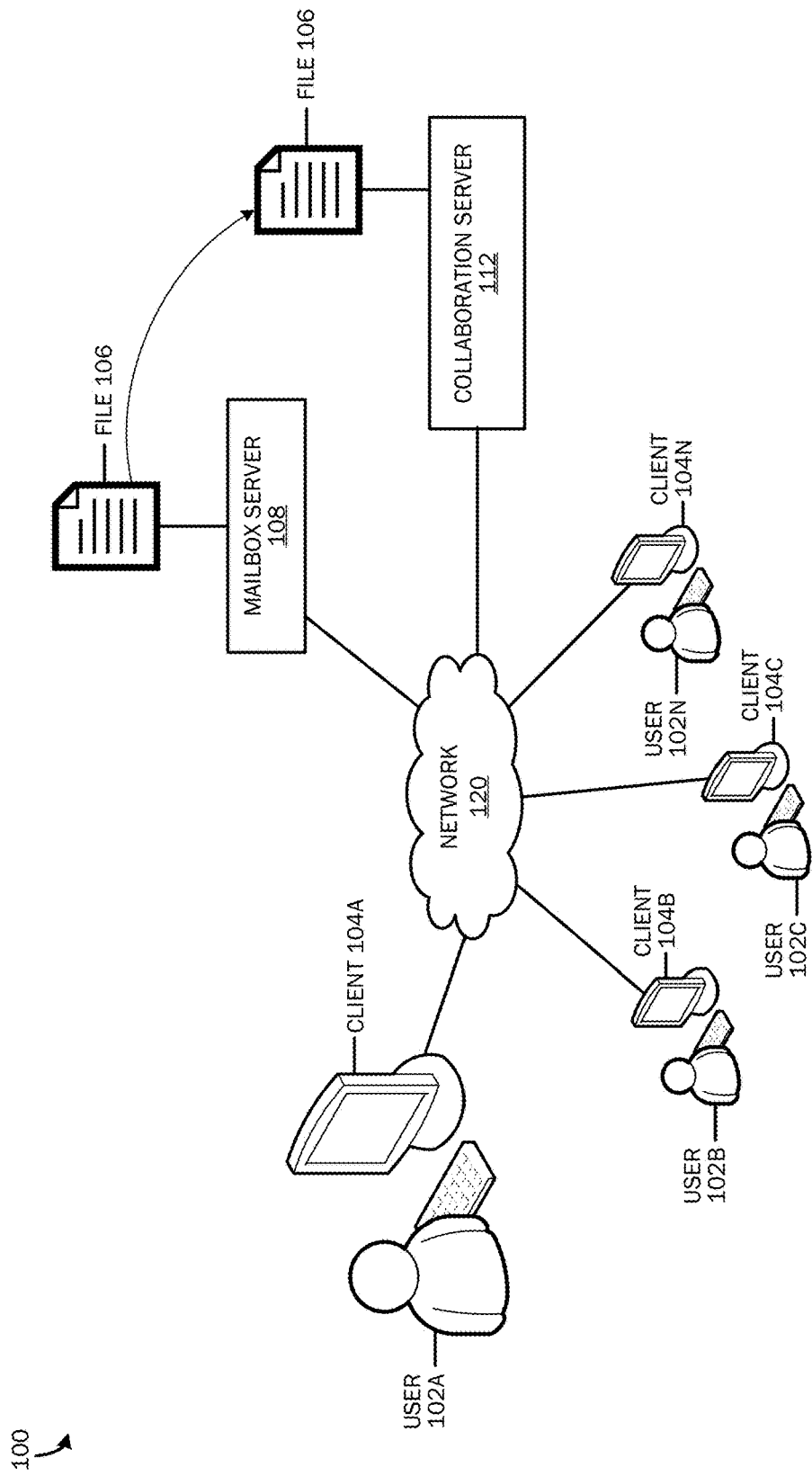
FIG. 1 is a simplified block diagram of system architecture for providing automatic uploading of attachments for co-authoring in a group.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

As briefly described above, embodiments of the present invention are directed to automatic uploading of electronic mail attachments to a collaborative storage location for enabling efficient co-authoring among a group of users. When an electronic mail item is received in association with a collaborative workgroup of a plurality of users, the mail item containing an attached content item such as a document, dataset, image, or the like, a user may select the attached content item for presentation in an immersive view pane in proximity to an electronic communication view pane to allow the user to review the received content item in a side-by-side or above/below orientation with an associated electronic communication item or thread. If the receiving user initiates an editing function on the displayed content item, a copy of the displayed content item is automatically stored to a collaborative group storage location associated with the user's collaborative workgroup at which members of the group store and from which members of the group retrieve various content items.

According to one embodiment, upon initiation of the editing function, an application programming interface (API) locates a storage location for the attached (and now selected for editing) content item and pushes the content item or a copy of the content item to the collaborative group storage location. The API next obtains a location identification (e.g., a uniform resource locator (URL)) at the collaborative storage location for the stored content item for return to the electronic communication client application with which the user has received the communication item containing the attached content item.

At the electronic communication client application, when the user begins editing the displayed content item in the immersive view pane, a communication (e.g., a responsive email message) is automatically created and is displayed in the electronic mail view pane. According to one embodiment, the automatically created communication may be a next response item to the email item with which the attached content item was received. In the responsive communication, an attachment for the being-edited content item is included which is not the actual content item, but which is a pointer to the being-edited content item stored at the collaborative group's storage location. In addition, the automatically generated communication may include a post to notify the recipients (e.g., the original sending user and/or one or more members of the associated collaborative workgroup) that the attached content item has been edited by the identified user and that the content has been stored at a given location. When the editing user saves his/her edits to the content item, the edits will be passed by the communication client to the collaborative group storage location and will be applied to (saved in) the stored copy of the content item.

When the automatically generated responsive communication is sent to the desired recipients, the receiving users may select the attachment in the communication (e.g., email) for locating the edited content item at the collaborative group storage location. According to an embodiment, as described above, selection of the attachment for the edited content item is a selection of a pointer to the storage location for the edited content item.

When the various group users locate the edited version of the content item, they may each review and edit the single stored edited content item in a group co-authoring environment. Thus, the first user in a group of users who edits a content item according to the foregoing embodiments stores a content item to the collaborative group storage location for co-authoring, review and editing by others in the group.

FIG. 1 is simplified block diagram illustrating a system 100 for electronic communication-based storage and use of documents and other content items to support multiple workflows. As Illustrated in FIG. 1, a variety of users 102*a*, 102*b*, 102*c*, 102*n* are illustrated in association with respective client devices 104*a*, 104*b*, 104*c*, 104*n*. The users and the associated client devices are illustrative of one or more users who may generate, edit, receive, send, or otherwise interact with content items of various types as described herein. The client devices 104*a*-104*n* are illustrative of a variety of computing devices, for example, desktop computing devises, laptop computing devices, tablet computing devices, handheld computing devices (mobile phones), and the like. Each of the example computing devices may be interacted with according to a variety of input means, for example, keyboard input, mouse input, electronic pen and ink input, touch input, gesture input, voice input, eye tracking input, and the like. At each of the client devices 104*a*-104*n*, a variety of software applications may be provided for allowing the one or more users to interact with a variety of content items. For example, software applications such as electronic mail applications, word processing applications, slide presentation applications, spreadsheet applications, notes taking applications, desktop publishing applications, calendaring applications, image processing and editing applications, and the like may be operated at the client devices by the one or more users 102*a*-102*n*. The network 120 is illustrative of an enterprise-based network, for example, an intranet, or a distributed computing network, for example, the Intranet, over which the various users may communicate with each other and with other computing systems, as described herein.

The mailbox server 108 is illustrative of an electronic mail system that may be located local to one of the various users or that may be located remotely from the various users for allowing electronic mail and other electronic communications between the various users. An example of such a mailbox server is EXCHANGE from Microsoft Corporation. The file 106 is illustrative of a content item that may be attached to an electronic communication that may be edited and that may be automatically pushed to and stored at a collaboration server 112 according to embodiments of the present invention. The collaboration server 112 is illustrative of a local or remote storage repository at which one or more content items may be stored. For example, the collaboration server 112 may be a shared resources server located at an enterprise accessible by the various users, or may be remotely located from the various users at which the various users may store and collaborate on various documents. An example of such a collaboration server 112 may include a SHAREPOINT server or ONEDRIVE server from Microsoft Corporation.

According to embodiments of the present invention, when an attached content item is received and is edited by a given user, the content item 106 or a copy of the content item 106 is automatically pushed to and is stored at the collaboration server 112 for access by one or more members by a collaborative workgroup of which the editing user is a member. According to embodiments, the editing user and one or more other users associated with the editing user may receive a pointer to the content item 106 stored at the collaboration server 112 for subsequent access and editing of a single copy of the content item 106 in a co-authoring environment.

Figure 2A:
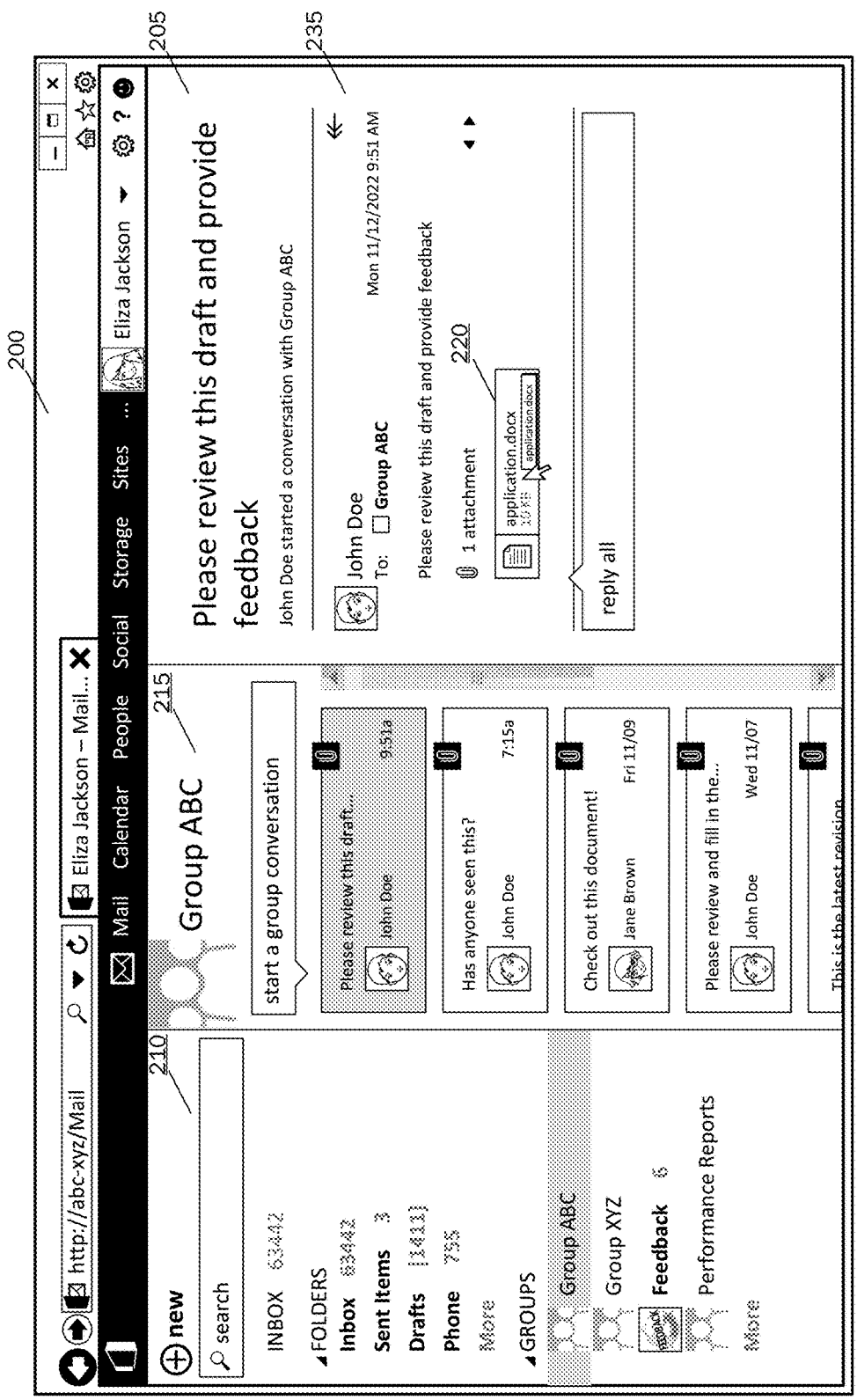
FIG. 2A illustrates a computer generated user interface of an example electronic mail interface.

As illustrated in FIG. 2A, a user interface 200 of an electronic mail application with which a user may send and receive a variety of electronic mail messages and with which a user may send and receive content item attachments according to embodiments of the present invention is illustrated. An electronic mail folder pane 210 is illustrated on the left side of the user interface 200 in which a variety of folders, contact items, group items, calendar items, and the like may be provided to allow a user to select various folders, contacts, or other items associated with his/her electronic mail application functionality. A group pane 215 is illustrated adjacent to the electronic mail folder pane 210 for containing identifying information, electronic communication conversation information, attached content items, and the like associated with a group of users that have associated with each other to form a collaborative workgroup. As should be appreciated, such a collaborative workgroup may include two or more users who associate with each other for any purpose. For example, such a collaborative workgroup maybe a group of employees of an enterprise who are tasked with performing and/or working on a given project. Another type of collaborative workgroup maybe include a group of participants in a school activity such as a sport, educational activity or social activity, a group collaborative workgroup may include a group of users involved in a networking project such as a charity organization, social gathering, and the like. In short, the two or more users who decide to associate with each other for performing some type of desired function may include any number of users associated with any number of projects or functions.

According to embodiments described herein, a group of users may utilize the functionalities described herein to send and receive attached content items, for example documents, images, data sets, and the like for review and/or editing by other members of the group. When a given member of the group receives an electronic communication, for example, an electronic mail containing an attached content item, the receiving user may select the attached content item for review and editing. When such a user begins to edit a given content item, the content item is automatically stored to the collaborative server 112, and a communication is automatically generated and sent to other members of the group to notify the other members that the content item is being edited by the editing user and that the content item has been stored for review by the other members of the group.

When the editing process is complete, the communication is automatically sent to the other users, and thus the other users may now access the edited copy of the content item at the collaborative server 112 so that the other users may now edit the edited version of content item provided by the editing user. Thus, the other users in the user's workgroup may now edit a single copy of the edited version of the content item to allow an efficient co-authoring experience that avoids a situation where multiple copies of a single content item are stored to the collaboration server 112 requiring version control and other measures to prevent confusion between different versions of the same content item.

Referring still to FIG. 2A, on the right side of the example user interface 200 is a displayed electronic communication viewing pane 205 in which a given electronic communication message may be displayed for allowing a user to read or otherwise interact with the given electronic communication message, for example, replying to the message, forwarding the message, and the like. According to one embodiment, the pane 205 may include a conversation thread comprised of one or more electronic communications or electronic communication threads generated by various members of the workgroup that may be interest to each member of the group. As should be appreciated, selection of one of the displayed electronic mail items in the pane 205 may cause a display of the contents of the selected electronic mail item in the electronic mail view pane 205, illustrated in FIG. 2A. As illustrated in FIG. 2A, an example electronic mail message 235 has been received by the receiving user, and the electron mail message includes an example attachment 220. As should be appreciated, the example attachment 220 is illustrative of any attached content item, for example, a word processing document, a spreadsheet document, a slide presentation document, a note documents, an image file, a photograph, and the like that may be received by the receiving user from a single user.

Figure 2B:
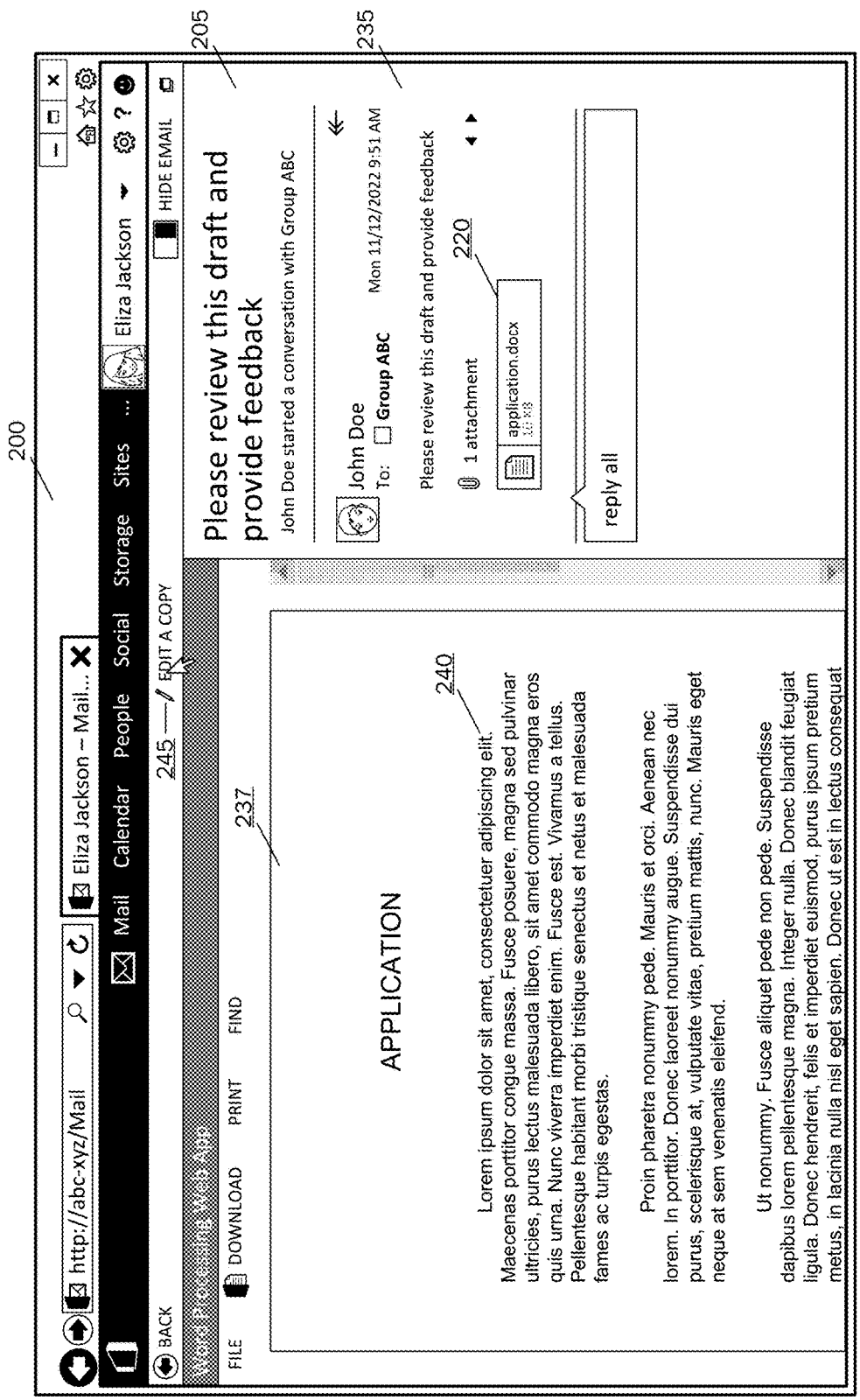
FIG. 2B illustrates an example computer generated user interface showing an electronic mail view pane and an immersive content view pane.

Referring now to FIG. 2B, according to embodiments of the present invention, if a user selects an attached contact item 220 (attached to a selected electronic mail item), the selected content item may be displayed in an immersive view pane 237 for allowing the user to review and interact with the associated content item (e.g., document) 240. As illustrated in FIG. 2B, the immersive view pane is positioned on the left side of the interface 200, and the electronic mail view pane 205 remains displayed on the right side of the user interface 200. As should be appreciated, the respective viewing panes may be displayed in other orientations. For example in a right/left orientation where the immersive view pane is displayed on the right side of the user interface and the electronic mail pane is displayed on the left side of the user interface 200, a top/bottom orientation where the immersive view pane is displayed on the top of the user interface 200 and the electronic mail pane is displayed on the bottom of the user interface 200, or a bottom/top orientation where the immersive view pane is displayed on the bottom of the interface 200 and the electronic view pane is displayed on a top of the user interface 200. Alternatively, if the computing device in use by the receiving user is a small form device, such a tablet computing device or mobile telephone, and display space in insufficient for displaying both the immersive view pane and the electronic mail view pane, then the immersive view pane 237 may be displayed over the entire display surface of the computing device, and a functionality button or control may be provided for selectively returning the electronic mail view pane to display, as desired. Alternatively, a truncated display of the electronic mail view pane may be provided and the remaining display space may be used for the immersive view pane.

Referring still to FIG. 2B, an edit/copy function 245 is provided for allowing the user to selectively edit the document 240 displayed in the immersive view pane. That is, as will be described below, selection of the edit/copy function 245 may cause a provision of functionality associated with the document 240 to allow the user to edit the document 240 in association with the provided functionality. As should be appreciated, the edit/copy function 245 is illustrative of one of a variety of functions that may be provided in the immersive view pane for allowing a user to operate on the document displayed in the immersive view pane. For example, other functions that may be provided, may include a send function for allowing the user to send the document 240 to another user, a save function for allowing the user to save the document to a storage location such as the collaboration server 112, described above, and the like.

Figure 2C:
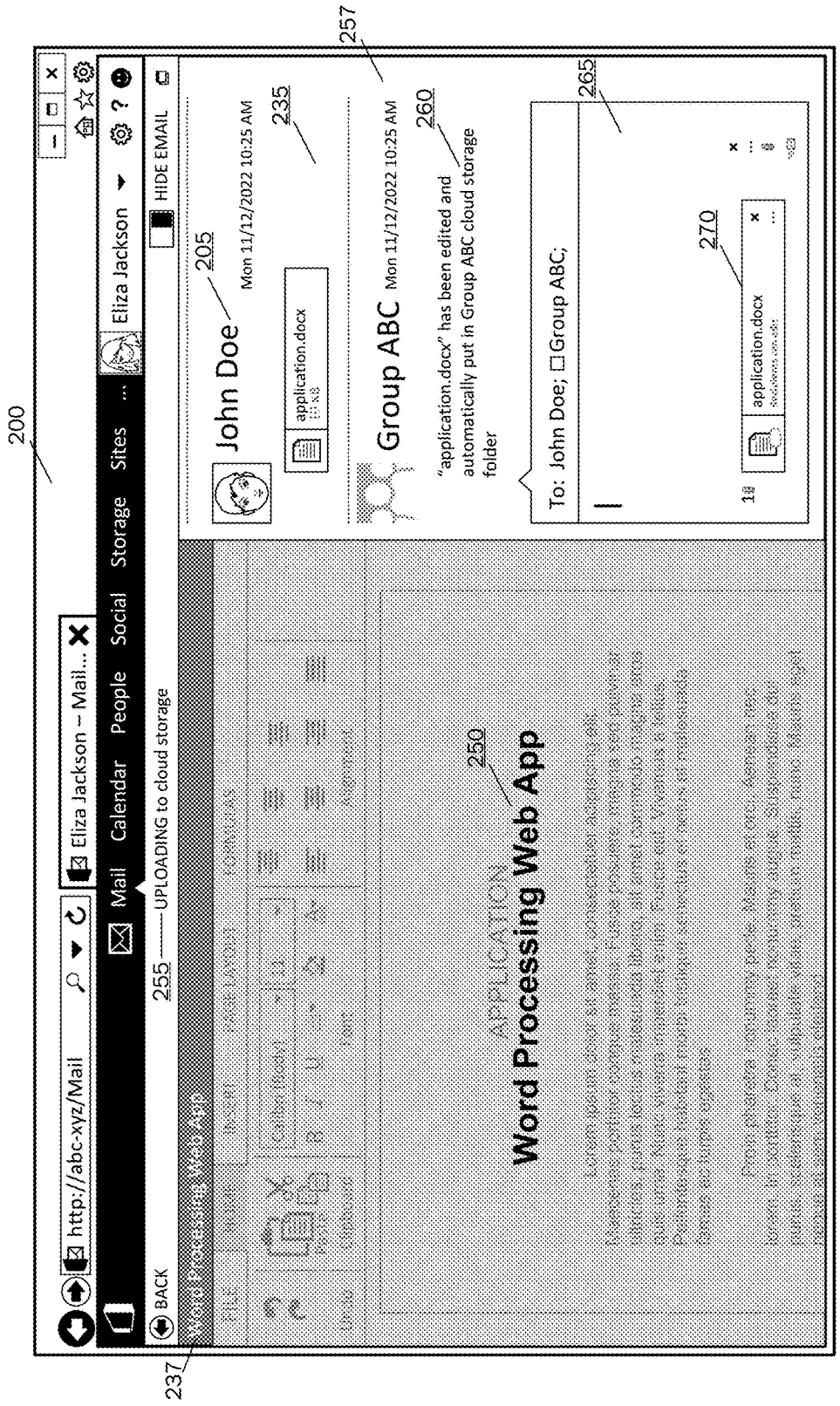
FIG. 2C illustrates an example computer generated user interface showing an electronic mail view pane and an immersive content view pane and illustrating a launching of a software application functionality for operating on a displayed content item.

According to embodiments of the present invention, if a user selects the edit/copy function 245 an application associated with the content item type for the content item displayed in the immersive view pane may be launched in the immersive view pane as illustrated FIG. 2C. In FIG. 2C, a word processing web-based application 250 is launched in response to a selection of an edit/copy function for the document displayed in the immersive view pane, as illustrated in FIG. 2B. That is, if the document 240 is a word processing application, then selection of an edit function associated with the document 240 may cause the launching and retrieval of word processing functionality for allowing a user to edit the document in association with application functionality with which the document was created. For example, if the document 240 is a spreadsheet document, then selection of an edit function 245 may cause the launching of a spreadsheet application functionality in the immersive view pane. Likewise, if the document 240 is a slide presentation, then selection of an edit 245 may cause the launching and provision of slide presentation application functionality in the immersive view pane for use with the document displayed in the immersive view pane. As illustrated in FIG. 2C, a web-based application 250 is launched in response to the selection of an edit/copy function 245, but as appreciated, a local or remote word processing application may similarly be launched for providing functionality in association with document 245.

Referring still to FIG. 2C, according to embodiments of the present invention, when a user begin an editing function on an attached content item, the attached content item or a copy of the attached content item is automatically pushed to or pulled to the collaboration server 112 for storage and for access by other members of the collaborative workgroup. According to one embodiment, a message 255 may be provided to the user to indicate to the user that his/her editing action is causing an uploading of the attached content item to the collaborative work storage location. According to one embodiment, the process of pushing or pulling the attached content item or a copy of the attached content item to the collaboration server 112 may be initiated immediately when the edit function 245 is selected, or may be initiated upon an actual editing function, for example, entering/deleting a character to the content item, adding/deleting a space to the content item, adding/deleting a carriage return, or the like.

Referring still to FIG. 2C, in addition to automatically pushing or pulling the attached content item or a copy of the attached content item to the collaboration server upon initiation of an editing function, a responsive communication that may be used by the editing user for corresponding with other members of the users collaborative workgroup is automatically generated for notifying other members of the group that the content item has been edited and has been automatically placed in the collaboration server 112 for access by the group. As illustrated in FIG. 2C, a post 260 may be automatically generated in the automatically generated communication 257 for providing such a notification to the group. In addition, the editing user may enter information, for example, a text string to provide information to other members of the group as to the edits he/she has performed on the edited content item.

Referring still to FIG. 2C, an attachment 270 illustrated in the automatically generated communication as an attachment corresponding to the edited content item. According to embodiments of the present invention, the attachment 270 is not an attachment of the actual edited content item, but contains a pointer to the edited content item as stored on the collaboration server 112 such that when other members of the users collaborative workgroup receive the automatically generated communication, selection of the attachment 270 may cause navigation to the stored edited content item to allow those users to review and edit the edited content item in a co-authoring environment. Thus, as should be understood from the forgoing, upon initiation of an editing function on a given content item, the edited content item is automatically converted to a shared content item on the collaboration server 112 for access by other users in the co-authoring work environment.

Figure 2D:
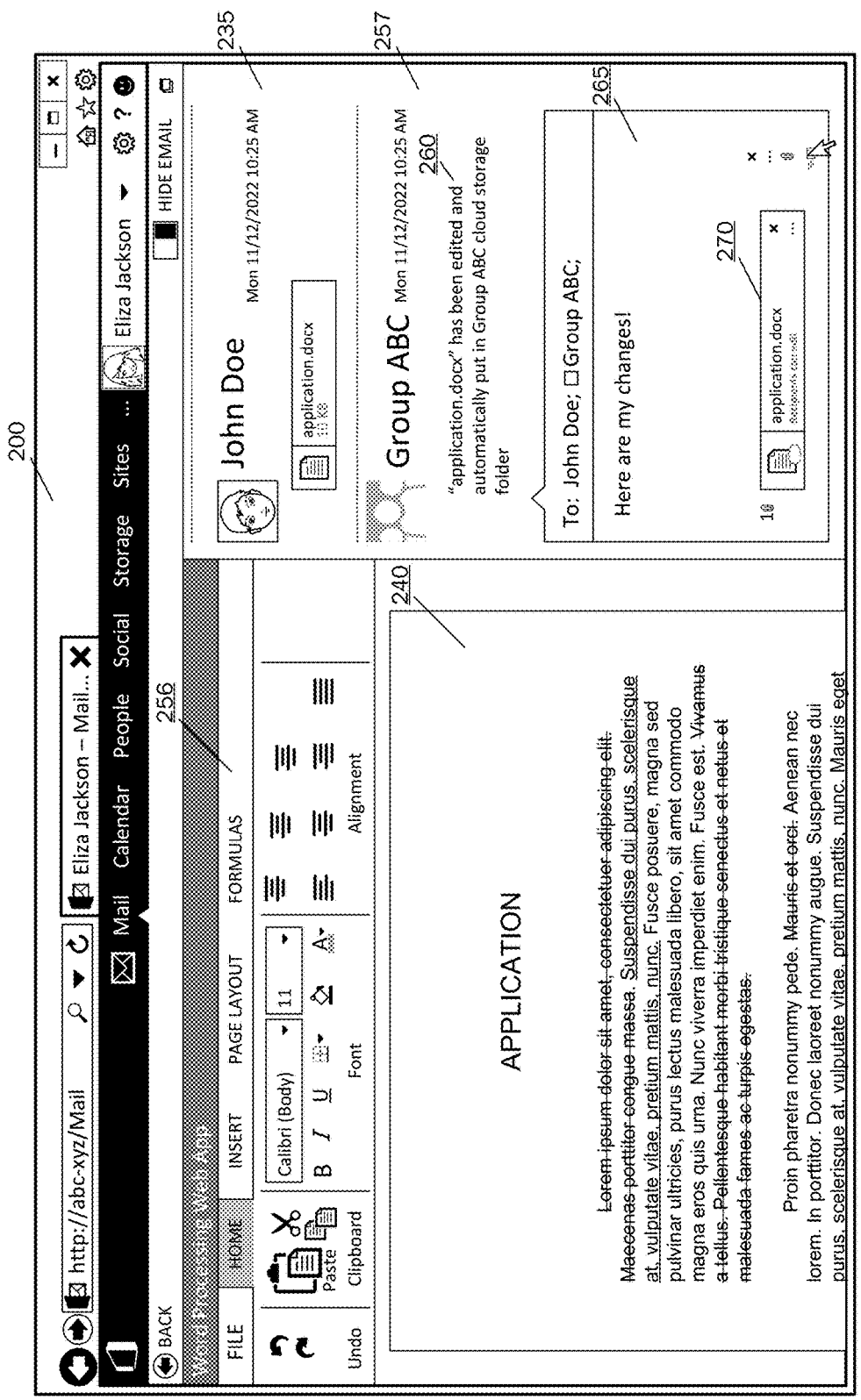
FIG. 2D illustrates an example computer generated user interface showing an electronic mail view pane and an immersive content view pane and showing an automatically generated communication associated with a content item.

Referring now to FIG. 2D, in response to a selection of the edit/copy function 245, as illustrated in FIG. 2B, and in response to a launching of an associated example word processing application, as illustrated in FIG. 2C, a variety of word processing functionalities 256 may be provided in the immersive view pane for allowing the receiving user to edit the document 240. As should be appreciated, an instance of a word processing application may be launched and displayed in the immersive view pane, or selected functionalities, for example, formatting functionalities may be provided in the immersive view pane for allowing user to operate certain word processing functions on the document 240. Likewise, if the document 240 is a spreadsheet document, then an instance of the spreadsheet application may be launched in the immersive view pane, or certain functionalities of spreadsheet application may be provided in the immersive view pane.

Referring still to FIG. 2D, the functionalities 256 provided in the immersive view pane may provide for various word processing application functionalities that may be applied to the document 240 by the receiving user to edit the received attachment (example attached word processing document). As should be appreciated, if the user desires to edit a portion of the document 240 not associated with a word processing functionality, for example, an image contained in the document 240, then functionalities required for editing such an image may be provided to allow the user to edit the image.

As described above with referenced to FIG. 2C, the automatically generated communication 257 provides the automatically generated post 260 for notifying other members of users group that the content item has been edited and has been stored at the collaboration server 112. When the user has completed editing of the content item 240, a send function on the user's electronic mail application may be utilized for automatically passing the communication 257 and post 260 and any comments 265 provided by the user to other members of the users group or to any other recipients identified by the user. When the user selects the send function, any edits made to the user to the content item 240 may be automatically passed from the electronic mailbox server 108, illustrated in FIG. 1, to the collaboration server 112 for application to the copy of the content item stored at the collaboration server 112. Alternatively, as a user is editing the content item 240 in the immersive view pane, edits may be automatically passed from the mailbox server to the collaboration server 112 on a periodic basis. According to one embodiment, when the user sends the automatically generated communication to the desired recipients, all edits made to the content item 240 are applied to the collaboration server version of the content item so that recipients of the communication may select the attachment 270 (pointer to the stored edited content item) for accessing the content item 240 and for reviewing and/or editing the content item 240 as desired in co-authoring environment.

Figure 2E:
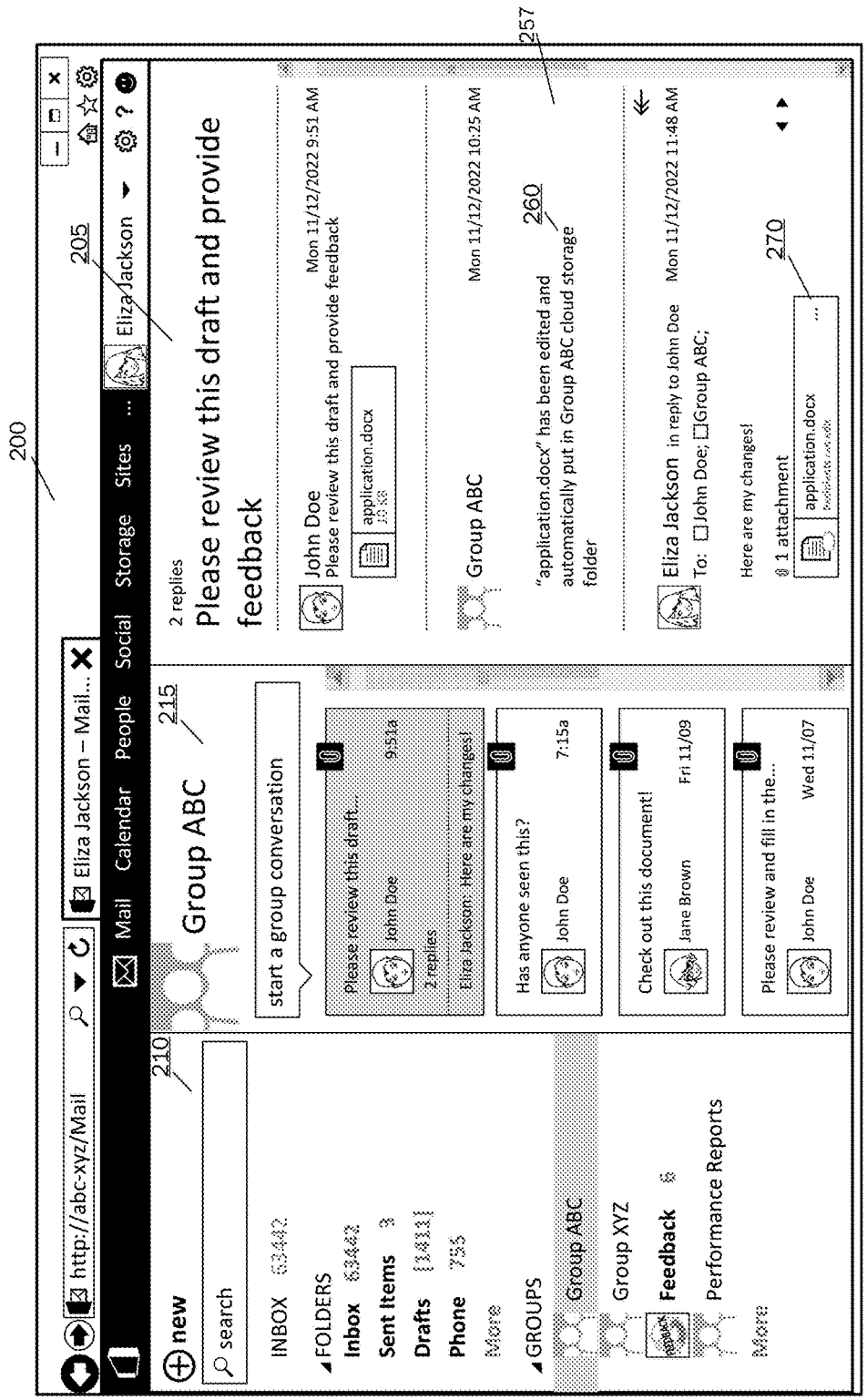
FIG. 2E illustrates a computer generated user interface of an example electronic mail interface and showing an automatically generated communication associated with a content item.
Figure 3:
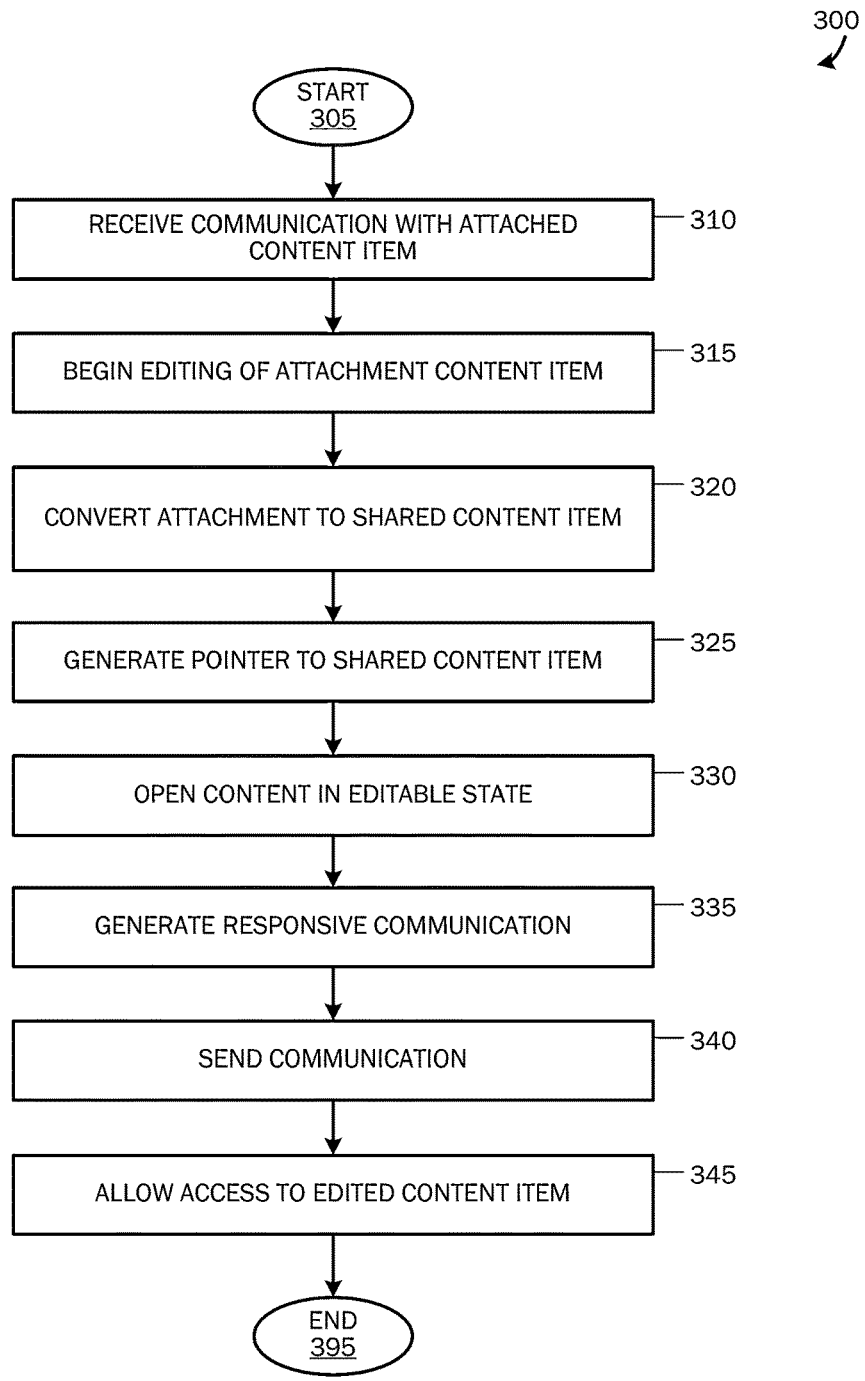
FIG. 3 is a flow chart illustrating a method for automatic uploading of attachments for co-authoring in a group.

Referring now to FIG. 2E, after the editing user has transmitted the automatically generated communication 257, as illustrated and described with reference to FIG. 2D, the transmitted communication 257 is now illustrated as part of a conversation thread occurring among members of the user's workgroup, and the post 260 and attachment 270 are available in the communication thread for review and selection by members of the users workgroup.

Having described a system architecture, various user interface components and various aspects of embodiments of the present invention with reference to FIGS. 1-2E, FIG. 3 is a flow chart illustrating a method for automatic uploading of attachments for co-authoring in a group. The routine 300 begins at start operation 305 and proceeds to operation 310 where a user receives an electronic communication item (e.g., electronic mail, text message, instant message, chat message, video message, etc.) from a sender where the electronic communication item includes one or more attached content items. As should be understood, if a received electronic communication item includes more than one attached content item, each of the attached content items may be interacted with, including editing as described above, and each interactive with attached content item may be stored to the collaboration server 112 for subsequent use by one or more members of the users collaborative workgroup, as described above.

At operation 315, the receiving user selects a received attachment icon, and the associated content item is displayed in the immersive view pane for review and editing by the receiving user. Upon selection of an editing function 245, as illustrated above with reference to FIG. 2B, the routine proceeds to operation 320. At operation 320, an application programming interface automatically finds the selected attachment on a storage location at which it has been stored by a previous user. For example, the attached content item may be stored at a local computing device, at a remote computing device, or a server containing one or more content items such as a server containing shared resources for a given enterprise or collection of enterprises. The application programming interface then automatically uploads (e.g., pushes) the selected content item or a copy of the selected content item to the collaboration server 112. According to one embodiment, in response to an API call, the storage location of the attached content item automatically pushes a copy of the attached content item to the collaboration server 112, or alternatively, the collaboration server 112 is directed to pull a copy of the attached content item to the collaboration server 112. Alternatively, the attached content item may be pushed or pulled from the mailbox server 108 to the collaboration server 112.

The copy of the attached document is then stored at the collaboration 112 and now the file 106 has been transferred to the collaboration server 112 and has been converted to a shared document that may be operated on by members of a collaborative workgroup who are authorized to access the content item for review and/or editing. Once the copy of the attached content item has been stored at the collaboration server 112, the API then fetches a location of the stored filed at the collaboration server 112 for use in generating a pointer to the stored content item to allow subsequent users to access the stored content item for review and/or editing.

The routine then proceeds to operation 325 where a pointer to the location of the stored file is automatically generated. That is, instead of creating a copy of the content item for attachment to a communication that will be forwarded to various recipients, as described above, a pointer to the location of the stored file is generated at operation 325. At operation 330, in response to the editing function initiated by the editing user, the content item is opened in an editable state in the immersive view pane, and functionality for editing the content item is provided in the immersive view pane, as described and illustrated above with reference to FIGS. 2C and 2D.

At operation 335, a responsive communication 260 is automatically generated including an automatically generated post 260 for notifying recipients of the communication that the associated content item has been stored at the collaboration server 112, by whom edits have been made to the associated content item, and providing a pointer 270 to allow recipients of the communication to access the stored edited content item for review and/or edit. At operation 340, the editing user may send the automatically generated communication to one or more desired recipients, and according to one embodiment, upon sending the automatically generated communication, and edits applied by the editing user to the content item 240 are automatically pushed to and saved in the copy of the content item at the collaboration server 112 such that when a receiving user accesses the edited copy of the content item at the collaboration server 112, such user will access a most recent version of the content item 240 that includes any edits made to the content item by the editing user.

At operation 345, other users who have received the communication may select the pointer 270 for automatically navigating to the stored edited content item 240 at the collaboration server 112 for engaging in a co-authoring session on a single copy of the edited content item 240. Thus, in accordance with embodiments of the present invention, each member of the collaborative workgroup may review and edit a single copy of a given content item that is stored at the collaboration server 112 by a first user in the group who first edits and causes a copy of the edited version of the content item to be stored at the collaboration server 112 for access of other members of the group. The routine 300 ends at operation 395.

While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
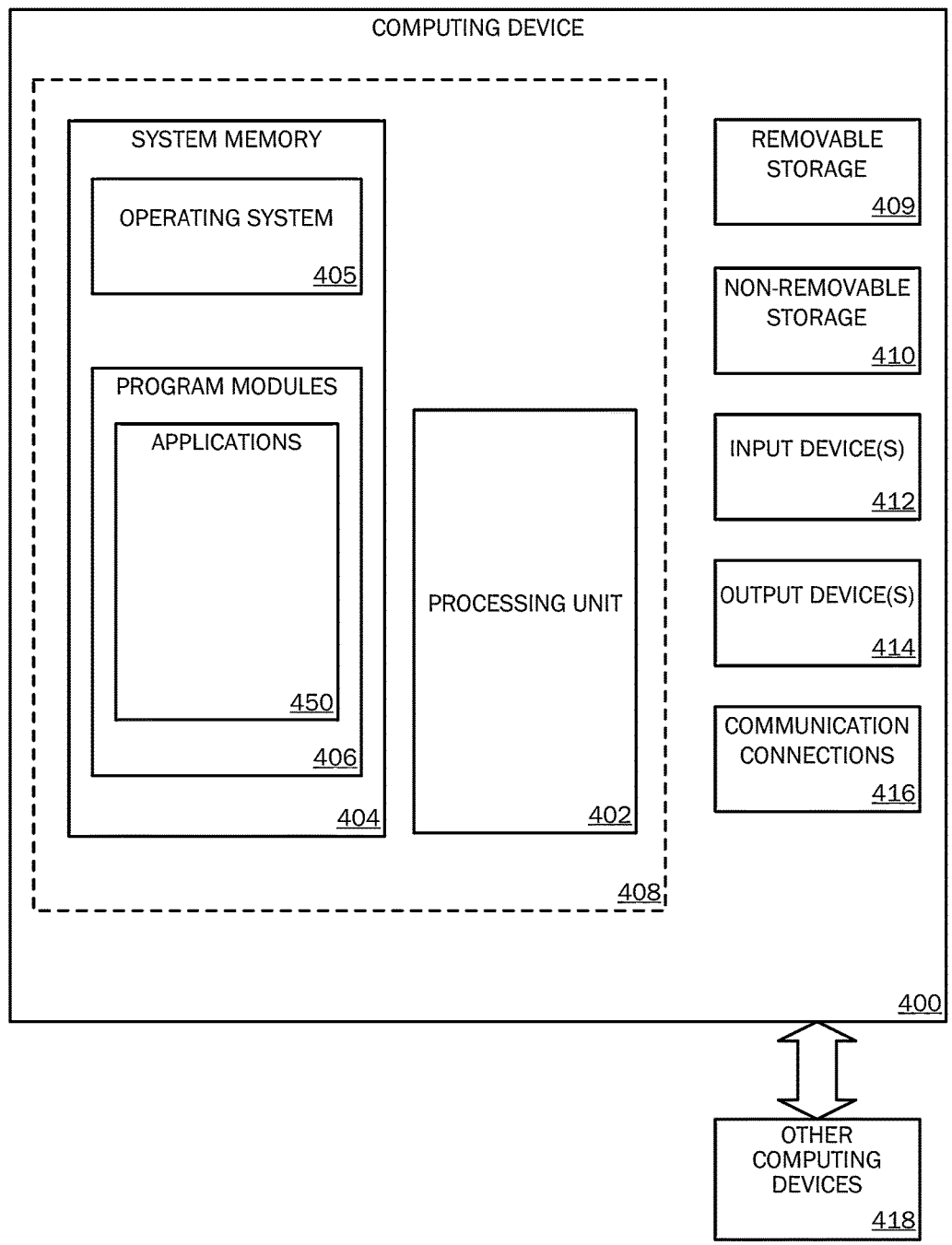
FIG. 4 is a block diagram illustrating example physical components of a computing device with which embodiments of the invention may be practiced.
Figure 5A:
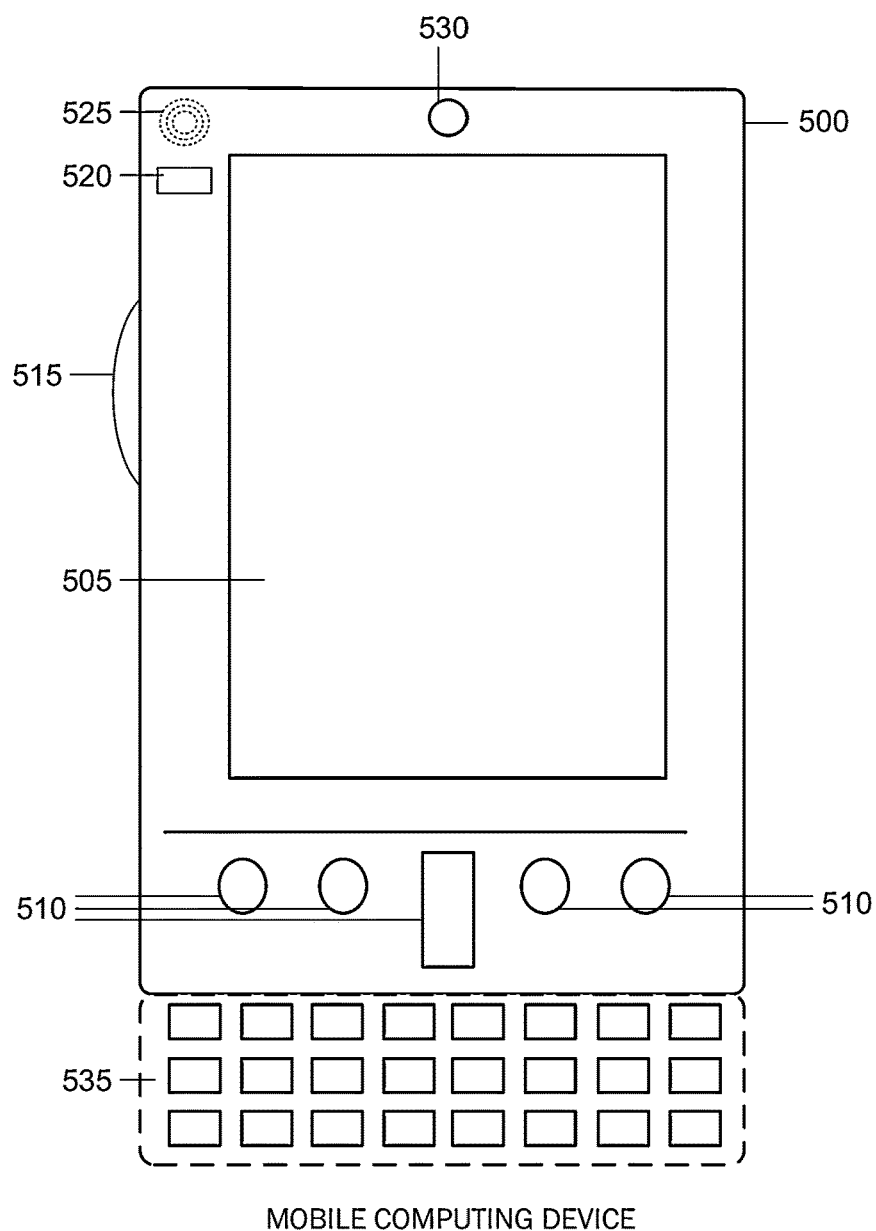
FIGS. 5A and 5B are simplified block diagrams of a mobile computing device with which embodiments of the present invention may be practiced.
Figure 5B:
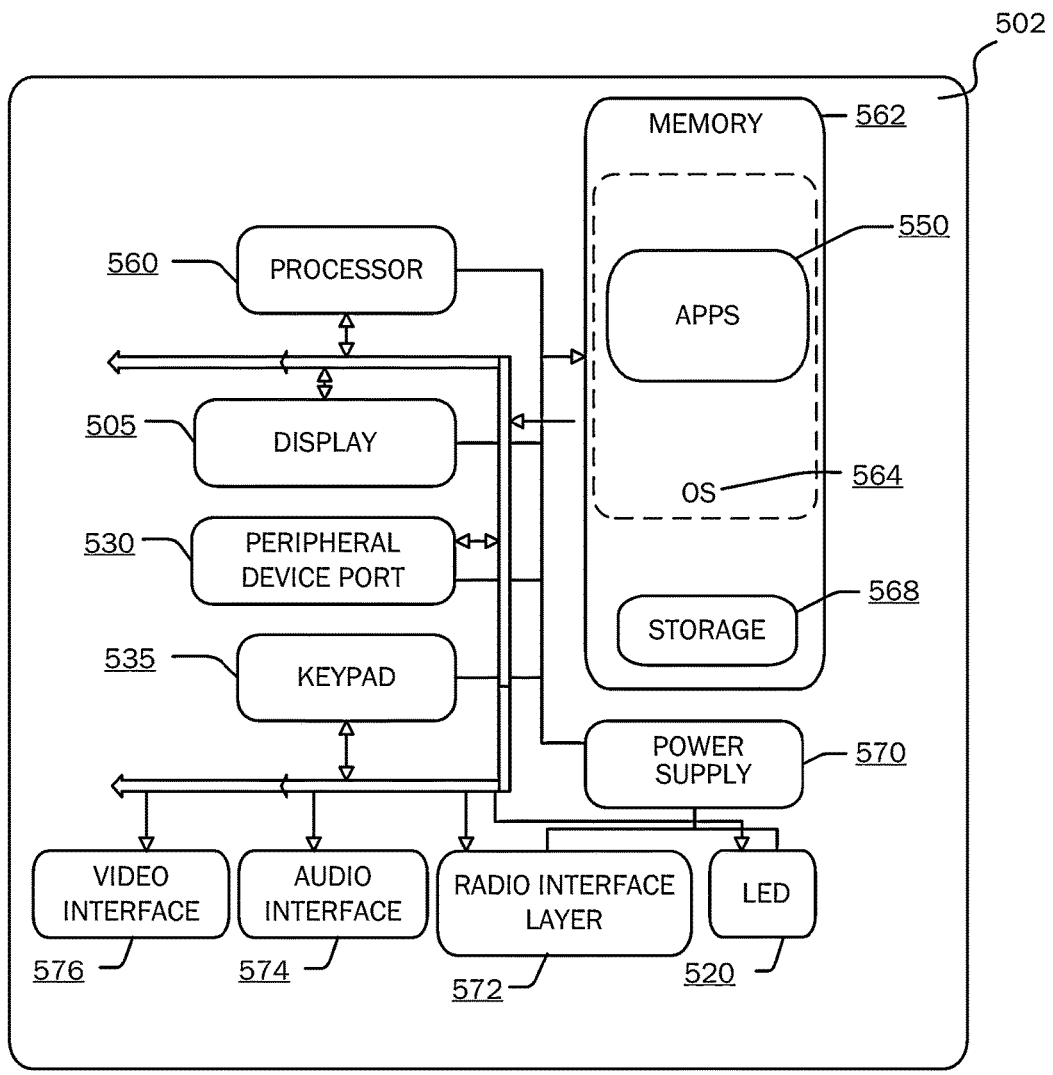
Figure 6:
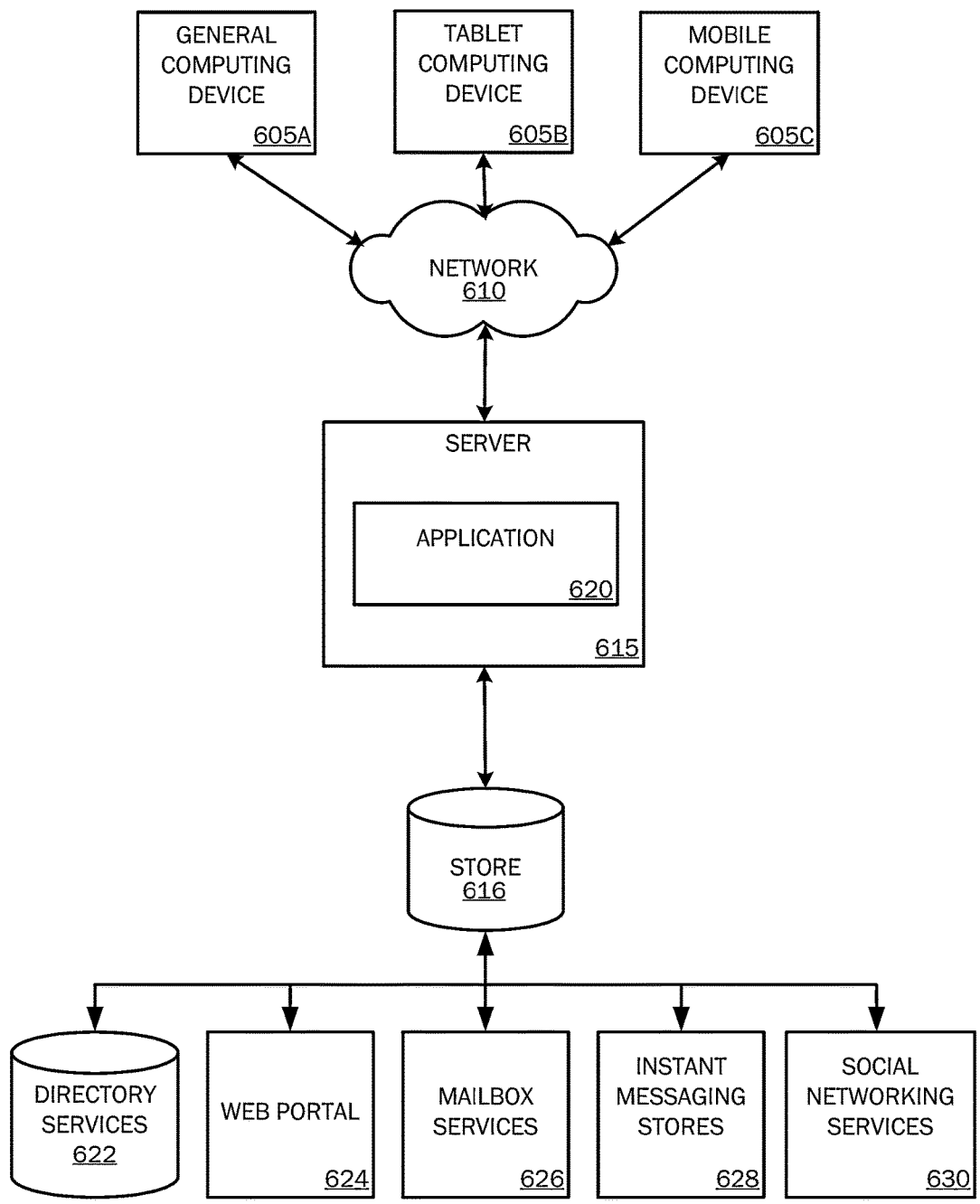
FIG. 6 is a simplified block diagram of a distributed computing system in which embodiments of the present invention may be practiced.

FIGS. 4-6 and the associated descriptions provide a discussion of a variety of operating environments in which embodiments of the invention may be practiced. However, the devices and systems illustrated and discussed with respect to FIGS. 4-6 are for purposes of example and illustration and are not limiting of a vast number of computing device configurations that may be utilized for practicing embodiments of the invention, described herein.

FIG. 4 is a block diagram illustrating physical components (i.e., hardware) of a computing device 400 with which embodiments of the invention may be practiced. The computing device components described below may be suitable for the client device 104A-N described above. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories. The system memory 404 may include an operating system 405 and one or more program modules 406 suitable for running software applications 450. The operating system 405, for example, may be suitable for controlling the operation of the computing device 400. Furthermore, embodiments of the invention may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 may perform processes including, but not limited to, one or more of the stages of the method 300 illustrated in FIG. 3. Other program modules that may be used in accordance with embodiments of the present invention and may include applications such as electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to providing an activity stream across multiple workloads may be operated via application-specific logic integrated with other components of the computing device 400 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 400 may also have one or more input device(s) 412 such as a keyboard, a mouse, a pen, a sound input device, a touch input device, etc. The output device(s) 414 such as a display, speakers, a printer, etc. may also be included. The aforementioned devices are examples and others may be used. The computing device 400 may include one or more communication connections 416 allowing communications with other computing devices 418. Examples of suitable communication connections 416 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which embodiments of the invention may be practiced. With reference to FIG. 5A, one embodiment of a mobile computing device 500 for implementing the embodiments is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative embodiments, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some embodiments, the mobile computing device 500 incorporates a vibration transducer for providing the user with tactile feedback. In yet another embodiment, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one embodiment of a mobile computing device. That is, the mobile computing device 500 can incorporate a system (i.e., an architecture) 502 to implement some embodiments. In one embodiment, the system 502 is implemented as a "smart phone" capable of running one or more applications (e.g., browser, e-mail, calendaring, contact managers, messaging clients, games, and media clients/players). In some embodiments, the system 502 is integrated as a computing device, such as an integrated personal digital assistant (PDA) and wireless phone.

One or more application programs 550 may be loaded into the memory 562 and run on or in association with the operating system 564. Examples of the application programs include phone dialer programs, electronic communication applications, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

The system 502 has a power supply 570, which may be implemented as one or more batteries. The power supply 570 might further include an external power source, such as an AC adapter or a powered docking cradle that supplements or recharges the batteries.

The system 502 may also include a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

The visual indicator 520 may be used to provide visual notifications and/or an audio interface 574 may be used for producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present invention, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio 572 or via a distributed computing network. Similarly, such data/information may be readily transferred between computing devices for storage and use according to well-known data/information transfer and storage means, including electronic mail and collaborative data/information sharing systems.

FIG. 6 illustrates one embodiment of the architecture of a system for providing the functionality described herein across components of a distributed computing environment. Content developed, interacted with, or edited in association with the applications described above may be stored in different communication channels or other storage types. For example, various documents may be stored using a directory service 622, a web portal 624, a mailbox service 626, an instant messaging store 628, or a social networking site 630. The application 620 (e.g., an electronic communication application) may use any of these types of systems or the like for providing the functionalities described herein across multiple workloads, as described herein. A server 615, 108 may provide the functionality to clients 605A-C and 104A-N. As one example, the server 615, 108 may be a web server providing the application functionality described herein over the web. The server 615, 108 may provide the application functionality over the web to clients 605A-C and 104A-N through a network 120, 610. By way of example, a client computing device 104A-N may be implemented and embodied in a personal computer 605A, a tablet computing device 605B and/or a mobile computing device 605C (e.g., a smart phone), or other computing device. Any of these embodiments of the client computing device may obtain content from the store 616.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

We claim:

1. A method of providing collaborative co-authoring via an electronic user interface, comprising:
    enabling display of one or more electronic communications in a communications pane;
    in response to a selection of an attachment attached to one of the one or more electronic communications, enabling display of a content item associated with the attachment by launching an application associated with the content item based on a file type of the content item in an immersive view pane,
    wherein the communications pane and the immersive view pane are simultaneously displayed in the computer-generated user interface to allow a viewing of both the communications pane and the immersive view pane in a single display of the computer generated user interface;
    in response to receiving a selection of an edit button displayed in the immersive view pane for editing the displayed content item:
        enabling display of application functionality controls of the application associated with the content item in the immersive view pane for receiving selective application of one or more functionalities of the application to the content item while maintaining the simultaneous display of the immersive view pane and the communications pane;
        in response to receiving an editing function on the content item, automatically storing a copy of the content item in a collaborative group storage location for storage and for subsequent use by members of a collaborative workgroup; and
        automatically creating a communication that is displayed in the communications pane of the computer-generated user interface to notify members of the collaborative workgroup that the content item has been edited based on a completion of the editing function, wherein the communication comprises:
            a posting identifying the content item and a location in the collaborative group storage location where the copy of the content item is stored; and
            an attachment pointer to direct the members of the collaborative workgroup to the location in the collaborative group storage where the copy of the content item stored;
    when the editing of the content item is complete, automatically sending the communication to the members of the collaborative workgroup;
    automatically posting the communication to a group conversation associated with the collaborative workgroup in a group co-authoring pane in the computer-generated user interface; and
    upon sending the automatically created communication to the members of the collaborative workgroup, automatically saving edits to the content item in the copy of the content item stored in the collaborative group storage location.

2. The method of claim 1, wherein storing the copy of the content item in the collaborative group storage location includes storing the copy of the content item in a collaboration server accessible by the members of the collaborative workgroup.

3. The method of claim 1, wherein automatically storing the copy of the content item in the collaborative group storage location is in response to receiving an edit to the content item.

4. The method of claim 1, wherein storing the copy of the content item in the collaborative group storage location includes:
locating a storage location for the
content item; generating a copy of the
content item; and
sending the copy of the content item to the collaborative group storage location.

5. The method of claim 4, further comprising:
obtaining a location identification at the collaborative storage location for the stored copy of the content item; and
returning the location identification to an electronic communications application for use in the communication.

6. The method of claim 5, wherein locating the storage location, generating the copy, sending the copy, obtaining the location identification, and returning the location identification are performed by an application programming interface (API) operative to store the copy of the content item in the collaborative group storage location for subsequent use by the members of the collaborative workgroup.

7. The method of claim 1, wherein the posting associated with the communication further identifies the member that edited the content item.

8. The method of claim 7, after automatically saving the edits to the content item and sending the communication to the members of the collaborative workgroup, providing access to the stored copy of the content item at the collaborative group storage location to the members of the collaborative workgroup.

9. The method of claim 1, wherein the communication further comprises comments provided by a member that edited the content item.

10. The method of claim 9, prior to automatically sending the communication, enabling display of the communication in the group conversation to enable a member editing the content item to edit the comments of the communication.

11. The method of claim 10, wherein editing the comments of the communication comprises receiving an entry of a text string for sending to the members of the collaborative workgroup.

12. The method of claim 1, wherein enabling display of the application functionality controls includes enabling display of functionality controls of a word processing application, a spreadsheet application, a slide presentation application, a notes taking application, a desktop publishing application, a calendar application, a tasks application or a reminders application.

13. The method of claim 1, wherein launching the application associated with the content item comprises launching a word processing application, a spreadsheet application, a slide presentation application, a notes taking application, a desktop publishing application, a calendar application, a tasks application or a reminders application.

14. The method of claim 1, wherein the one or more electronic communications are of a communications type belonging to one or more of an electronic mail communication, a text message communication, a chat session communication, an instant messaging communication, a video communication, an electronic calendar item, an electronic task item, or an electronic reminder item.

15. A method for generating a computer-generated user interface, comprising:
enabling display of one or more electronic communications in a communications pane;
in response to a selection of an attachment attached to one of the one or more electronic communications, enabling display of a content item associated with the attachment by launching an application associated with the content item based on a file type of the content item in an immersive view pane, wherein the communications pane and the immersive view pane are simultaneously displayed in the computer-generated user interface to allow a viewing of both the communications pane and the immersive view pane in a single display of the computer-generated user interface;
in response to receiving a selection of an edit button displayed in the immersive view pane for editing the displayed content item:
enabling display of application functionality controls of the application associated with the content item in the immersive view pane for receiving selective application of one or more functionalities of the application to the content item while maintaining the simultaneous display of the immersive view pane and the communications pane;
in response to receiving an editing function on the content item, automatically transmitting a copy of the content item to a collaborative group storage location for storage in the collaborative group storage location for subsequent use by one or more members of a collaborative workgroup; and
automatically generating a communication that is displayed in the communications pane of the computer-generated user interface to notify members of the collaborative workgroup that the content item has been is being edited based on a completion of the editing function, the communication comprising:
a posting identifying the content item and a location in the collaborative group storage location where the copy of the content item is stored;
an attachment pointer to direct the members of the collaborative workgroup to the location in the collaborative group storage where the copy of the content item stored; and
comments provided by a member of the collaborative workgroup that edited the content item;
when the editing of the content item is complete, automatically sending the communication to the members of the collaborative workgroup to indicate that the copy of the content item stored in the collaborative group storage location can be accessed;
automatically posting the communication to a group conversation associated with the collaborative workgroup in a group co-authoring pane in the computer-generated user interface; and
upon sending the communication, automatically pushing edits to the content item to the collaborative group storage location for storage in the copy of the displayed content item.

16. A computer storage media storing computer executable instructions, which when executed by a computer perform a method for providing collaborative content editing via an electronic communications user interface, comprising:
in a computer-generated user interface, providing a communications pane in which is disposed one or more electronic communications, where at least one of the one or more electronic communications includes an attachment;

in response to a selection of the attachment, enabling display of a content item associated with the attachment by launching an application associated with the content item based on a file type of the content item in an immersive view pane in the computer-generated user interface for allowing a view of both the content item and the one or more electronic communications in a single display of the computer-generated user interface;

in response to receiving a selection of an edit button displayed in the immersive view pane for editing the displayed content item:

enabling display of application functionality controls of the application associated with the content item in the immersive view pane for receiving selective application of one or more functionalities of the application to the content item while maintaining the simultaneous display of the immersive view pane and the communications pane;

automatically sending a copy of the content item to a collaborative group storage location for storage for subsequent use by one or more members of a collaborative workgroup; and automatically generating a communication that is displayed in the communications pane of the computer-generated user interface to notify members of the collaborative workgroup that the content item has been edited, the communication comprising:

a posting identifying the content item and a location in the collaborative group storage location where the copy of the content item is stored;

an attachment pointer to direct the members of the collaborative workgroup to the location in the collaborative group storage where the copy of the content item stored; and comments provided by a member of the collaborative workgroup that edited the content item;

automatically posting the communication to a group conversation associated with the collaborative workgroup in a group co-authoring pane in the computer-generated user interface;

when the editing of the content item is complete, automatically sending the communication to the members of the collaborative workgroup; and upon sending the communication, automatically pushing edits to the content item to the collaborative group storage location for storage in the copy of the content item.

* * * * *